US008878460B2

(12) United States Patent
Lu (10) Patent No.: US 8,878,460 B2
(45) Date of Patent: Nov. 4, 2014

(54) DC-DC CONVERTER PROTECTION CIRCUIT AND PROTECTION METHOD THEREOF (71) Applicant: uPI semiconductor corp., Zhubei (TW)

(72) Inventor: Wen-Fu Lu, Zhubei (TW)

(73) Assignee: UPI Semiconductor Corporation, Zhubei, Hsinchu (TW)

( * ) Notice: Subject to any disclaimer, the term of this patent is extended or adjusted under 35 U.S.C. 154(b) by 0 days.

(21) Appl. No.: 14/155,441

(22) Filed: Jan. 15, 2014

(65) Prior Publication Data

US 2014/0197739 A1 Jul. 17, 2014

(30) Foreign Application Priority Data

Jan. 17, 2013 (TW) .............................. 102101771 A (51) Int. Cl.
H05B 37/02 (2006.01)
H02H 7/12 (2006.01)
H05B 33/08 (2006.01)

(52) U.S. Cl.
CPC ......... H02H 7/1213 (2013.01); H05B 33/0887 (2013.01); H05B 33/0815 (2013.01)
USPC ........... 315/307; 315/291; 315/224; 315/247; 363/56.03; 363/56.04; 363/21.12; 363/21.17; 361/18; 361/91.1; 361/91.2; 323/276; 323/277; 323/282

(58) Field of Classification Search
CPC ............... H05B 37/02; H05B 33/0815; H05B 33/0842; H02M 1/32; H02M 1/36; H02M 3/156; H02M 1/4255; H02M 2001/4291; H02M 3/33507
USPC ................ 315/291, 307, 224, 247, 308, 312, 315/185 R; 363/21.12, 21.17, 56.03, 56.04, 363/56.05; 361/18, 21, 56, 57, 91.1, 91.2; 323/276, 277, 280, 282, 284
See application file for complete search history.

(56) References Cited

U.S. PATENT DOCUMENTS 4,890,210 A * 12/1989 Myers ......................... 363/21.11
5,023,542 A *  6/1991 Banura .......................... 323/284
6,618,031 B1 *  9/2003 Bohn et al. ..................... 345/83
6,791,283 B2 *  9/2004 Bowman et al. .............. 315/291

(Continued)

FOREIGN PATENT DOCUMENTS

CN 101599701 B 9/2011

OTHER PUBLICATIONS

Taiwan Office Action dated Jul. 4, 2014.

Primary Examiner — Haiss Philogene
(74) Attorney, Agent, or Firm — McClure, Qualey & Rodack, LLP (57) ABSTRACT A protection circuit of a DC-DC converter is disclosed. An input terminal of the DC-DC converter receives an input voltage and an output terminal of the DC-DC converter provides an output voltage. The DC-DC converter includes an output stage between the input terminal and the output terminal. The protection circuit includes a current sensor, a comparator, a determining circuit, and a protection control circuit. The current sensor provides a sensing signal. The comparator compares a default over-voltage with the sensing signal to provide an over-current control signal. The determining circuit provides a determining control signal. The protection control circuit determines whether to enable a short protection according to the over-current control signal and the determining control signal.

16 Claims, 12 Drawing Sheets

(56) References Cited

U.S. PATENT DOCUMENTS

| | | | |
|---|---|---|---|
| 6,952,355 B2 * | 10/2005 | Riggio et al. | 363/21.15 |
| 8,363,369 B2 * | 1/2013 | Lin et al. | 361/91.1 |
| 2010/0123978 A1 | 5/2010 | Lin et al. | |
| 2011/0002068 A1 | 1/2011 | Hu et al. | |

* cited by examiner

DC-DC CONVERTER PROTECTION CIRCUIT AND PROTECTION METHOD THEREOF

BACKGROUND OF THE INVENTION

1. Field of the Invention

The invention relates to a DC-DC converter; in particular, to a DC-DC converter protection circuit and a protection method thereof.

2. Description of the Prior Art

Figure 1:
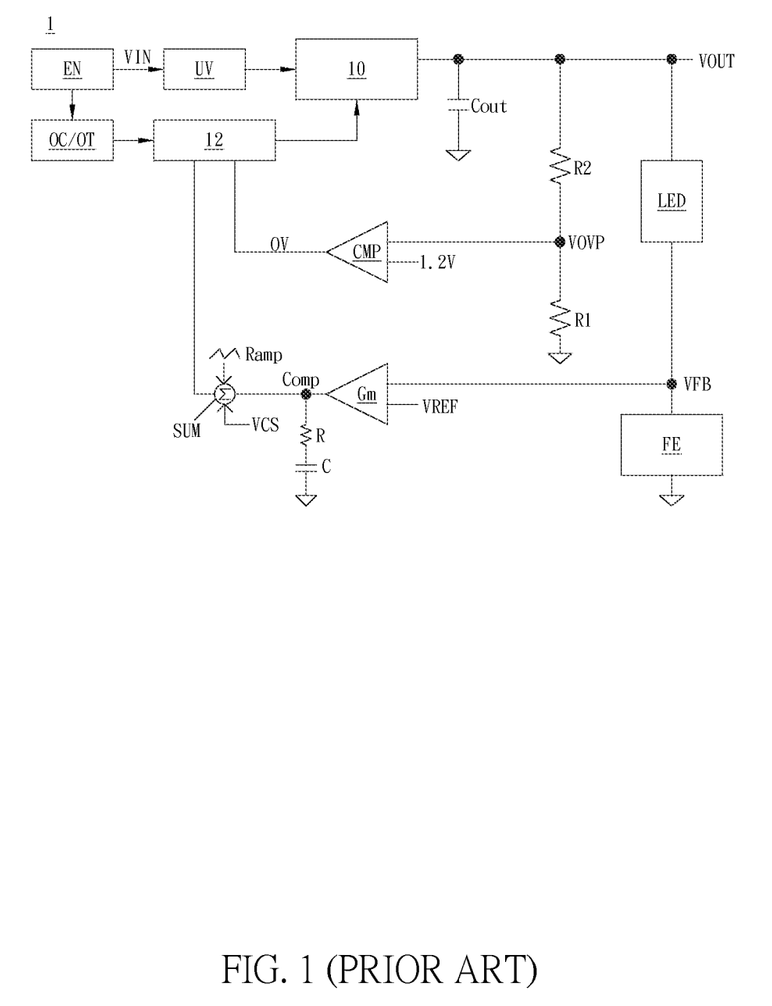
FIG. 1 illustrates a schematic diagram of the DC-DC converter protection circuit in the prior art.

As shown in FIG. 1, the circuit protection methods conventionally used in a circuit with a DC-DC converter 1 include: (1) a detection unit to detect whether the input voltage VIN is too low; (2) an over-temperature protection to prevent the circuit temperature from becoming too high; (3) an over-voltage protection to prevent the output voltage VOUT from becoming too high; and (4) an over-current protection to prevent the output voltage VOUT from being overloaded.

The above-mentioned circuit protection methods can prevent the circuit with the DC-DC converter 1 from being damaged; however, these circuit protection methods fail to provide enough protection to an inductor and a schottky diode disposed in the output stage 10 of the DC-DC converter 1. Once the output voltage VOUT becomes abnormal, the inductor and the schottky diode in the output stage 10 may become open or short, and the DC-DC converter 1 will be easily damaged.

SUMMARY OF THE INVENTION

Therefore, the invention provides a DC-DC converter protection circuit and a protection method thereof to solve the above-mentioned problems occurred in the prior arts.

A scope of the invention is to provide a protection circuit of a DC-DC converter. In this embodiment, the DC-DC converter includes an input terminal, an output terminal, and an output stage. The input terminal receives an input voltage and the output terminal provides an output voltage. The output stage is disposed between the input terminal and the output terminal. The protection circuit includes a current sensor, a first comparator, a determining circuit, and a protection control circuit. The current sensor is coupled to at least one circuit unit of the output stage and provides a sensing signal. The first comparator is coupled to the current sensor and compares a default over-voltage with the sensing signal to provide an over-current control signal. The determining circuit provides a determining control signal. The protection control circuit is coupled to the determining circuit and the first comparator and determines whether to enable a short protection according to the over-current control signal and the determining control signal.

In an embodiment, the determining circuit includes a first feedback circuit and a second comparator. The first feedback circuit provides a feedback control signal. The second comparator is coupled to the first feedback circuit and provides the determining control signal according to the feedback control signal and a first default voltage.

In an embodiment, the determining circuit includes a first feedback circuit and a second comparator. The second comparator is coupled to the first feedback circuit. The first feedback circuit includes an error amplifier for receiving a first feedback voltage and a reference voltage. When the over-current control signal indicates an over-current event, if the first feedback voltage is larger than the reference voltage, the protection control circuit turns off a transistor of the output stage according to the over-current control signal and the determining control signal.

In an embodiment, the determining circuit includes a first feedback circuit and a second comparator. The second comparator is coupled to the first feedback circuit. The first feedback circuit includes an error amplifier for receiving a first feedback voltage and a reference voltage and providing a feedback control signal according to the first feedback voltage and the reference voltage. When the over-current control signal indicates an over-current event, if the first feedback voltage is smaller than the reference voltage and the feedback control signal is larger than a first default voltage, the protection control circuit enables the short protection according to the determining control signal provided by the second comparator.

In an embodiment, the determining circuit includes a time control circuit coupled to the first comparator. When the over-current control signal indicates an over-current event, the time control circuit counts a default time. When the default time is over, if the over-current control signal still indicates the over-current event, the time control circuit controls the protection control circuit to enable the short protection.

In an embodiment, when the over-current control signal indicates an over-current event, the time control circuit counts a default time. When the default time is over, if the over-current control signal still indicates the over-current event, the time control circuit controls the protection control circuit to enable the short protection.

In an embodiment, the protection circuit further includes a second feedback circuit and a third comparator. The second feedback circuit provides a second feedback voltage. The third comparator compares the second feedback voltage with a second default voltage to provide an over-voltage control signal, and the protection control circuit enables an open protection according to the over-voltage control signal.

In an embodiment, the output terminal of the DC-DC converter is coupled to at least one LED string. The determining circuit includes a first feedback circuit, and the first feedback circuit is coupled to the at least one LED string to form a circuit for protecting a LED driving circuit.

In an embodiment, a protection switch is coupled between the input terminal and the output stage and coupled to the protection control circuit. When the protection control circuit enables the short protection, and the protection control circuit turns off the protection switch.

Another scope of the invention is to provide a protection method of a DC-DC converter. In this embodiment, the DC-DC converter includes an input terminal, an output terminal, and an output stage. The input terminal receives an input voltage and the output terminal provides an output voltage. The output stage is disposed between the input terminal and the output terminal. The protection method includes steps of: (a) providing a sensing signal; (b) comparing a default over-voltage with the sensing signal to provide an over-current control signal; (c) providing an determining control signal; and (d) determining to enable a short protection according to the over-current control signal and the determining control signal.

Compared to the prior arts, the DC-DC converter protection circuit and the protection method thereof disclosed in this invention have following advantages of:

(1) effectively determining whether the inductor and the schottky diode in the DC-DC converter is open or short to prevent the DC-DC converter circuit from being damaged;

(2) effectively preventing the DC-DC converter circuit from being in an over-current state for a long time, so that the DC-DC converter circuit will not be burned by the increasing temperature of the DC-DC converter circuit; and (3) suitable for the structures of DC-DC boost converter or LED back light driver and capable of avoiding the failure of external loop caused by the damage of DC-DC converter.

The advantage and spirit of the invention may be understood by the following detailed descriptions together with the appended drawings.

DETAILED DESCRIPTION OF THE INVENTION

Figure 2A:
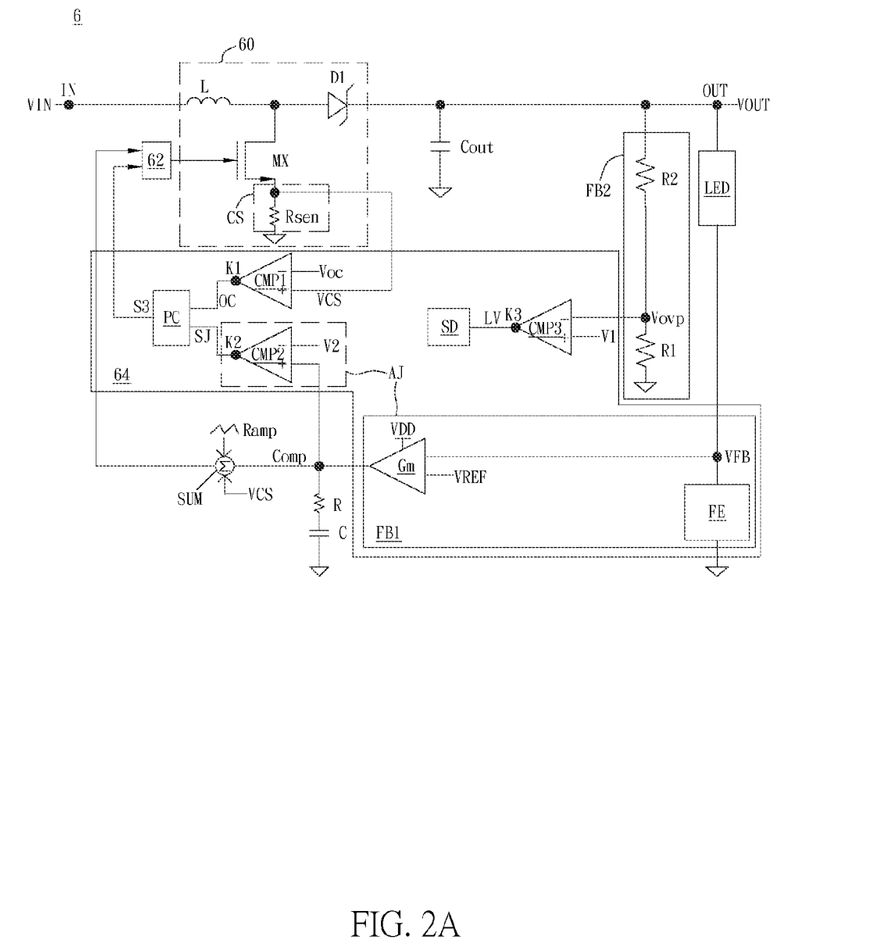
FIG. 2A illustrates a schematic diagram of the DC-DC converter protection circuit in an embodiment of the invention.

A preferred embodiment of the invention is a protection circuit of a DC-DC converter. In this embodiment, the protection circuit is used to provide enough open protection and short protection to the DC-DC converter. Please refer to FIG. 2A. FIG. 2A illustrates a schematic diagram of the DC-DC converter protection circuit in this embodiment.

As shown in FIG. 2A, the DC-DC converter 6 includes an input terminal IN, an output terminal OUT, an output stage 60, and a driver 62. The DC-DC converter 6 uses the input terminal IN to receive an input voltage VIN and uses the output terminal OUT to provide an output voltage VOUT. The output stage 60 is disposed between the input terminal IN and the output terminal OUT.

In this embodiment, the output stage 60 includes active and passive circuit units such as an inductor L, a schottky diode D1, and a transistor MX, but not limited to this. The inductor L is coupled between the input terminal IN and the schottky diode D1; the schottky diode D1 is coupled between the inductor L and the output terminal OUT; one terminal of the transistor MX is coupled between the inductor L and the schottky diode D1, another terminal of the transistor MX is coupled to a sensing resistor Rsen, and a gate of the transistor MX is coupled to the driver 62; the sensing resistor Rsen is coupled between the transistor MX and a ground terminal.

The protection circuit 64 includes a current sensor CS, a first comparator CMP1, a determining circuit AJ, a second feedback circuit FB2, and a protection control circuit PC. In this embodiment, the determining circuit AJ includes a second comparator CMP2 and a first feedback circuit FB1. The first feedback circuit FB1 includes an error amplifier Gm and a feedback unit FE; the second feedback circuit FB2 includes a first resistor R1 and a second resistor R2 coupled in series; the current sensor CS includes the sensing resistor Rsen, but not limited to this.

The sensing resistor Rsen of the current sensor CS is coupled to the first comparator CMP1, the transistor MX, and the ground terminal. The current sensor CS provides a sensing signal. In practical application, the sensing signal can be a sensing current or a voltage related to the sensing current, but not limited to this. A first input terminal + of the first comparator CMP1 is coupled to the current sensor CS. A second input terminal − of the first comparator CMP1 is coupled to a default over-current Voc. An output terminal K1 of the first comparator CMP1 is coupled to the protection control circuit PC. A first input terminal + of the second comparator CMP2 is coupled between the error amplifier Gm and an accumulator SUM. A second input terminal − of the second comparator CMP2 is coupled to a reference voltage V2 (very close to the operating voltage VDD). An output terminal K2 of the second comparator CMP2 is coupled to the protection control circuit PC. The protection control circuit PC is coupled to the driver 62. The driver 62 is coupled to the gate of the transistor MX.

The protection circuit 64 includes a third comparator CMP3 and an open protection control circuit SD. A first input terminal + of the third comparator CMP3 is coupled to a reference voltage V1. A second input terminal − of the third comparator CMP3 is coupled between the first resistor R1 and the second resistor R2.

An output terminal K3 of the third comparator CMP3 is coupled to the open protection control circuit SD.

One terminal of the output capacitor Cout is coupled between the output stage 60 and the output terminal OUT and the other terminal of the output capacitor Cout is coupled to the ground terminal One terminal of the second feedback circuit FB2 is coupled between the output stage 60 and the output terminal OUT and the other terminal of the second feedback circuit FB2 is coupled to the ground terminal. The light-emitting diode string LED is coupled between the output terminal OUT and the feedback unit FE. The feedback unit FE is coupled between the light-emitting diode string LED and the ground terminal One input terminal of the error amplifier Gm is coupled between the light-emitting diode string LED and the feedback unit FE; the other input terminal of the error amplifier Gm is coupled to the reference voltage VREF; an output terminal of the error amplifier Gm is coupled to the accumulator SUM. One terminal of the resistor R and the capacitor C coupled in series is coupled between the error amplifier Gm and the accumulator SUM and the other terminal of the resistor R and the capacitor C coupled in series is coupled to the ground terminal. The accumulator SUM is coupled between the error amplifier Gm and the driver 62 and receives a ramp signal Ramp and a sensing voltage VCS.

Figure 3:
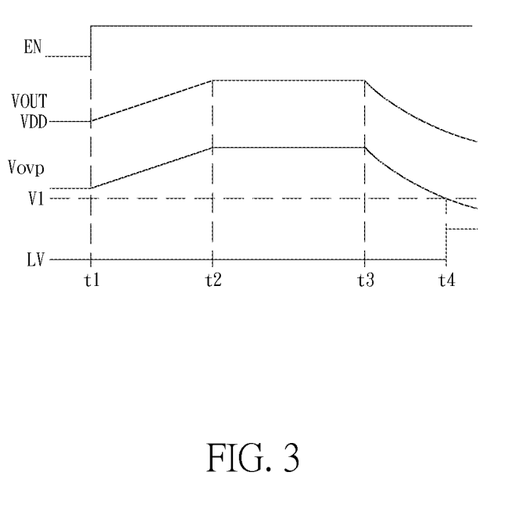
FIG. 3 illustrates a timing diagram of the signals when the DC-DC converter protection circuit of the invention provides an open protection.

As to how the protection circuit 64 of the invention provides enough open protection to the DC-DC converter 6, please refer to FIG. 2A and FIG. 3. When the output stage 60 receives the input voltage VIN, at a first time t1, a soft-start is performed by an enable signal EN and the output voltage VOUT will be gradually increased until the output voltage VOUT reaches a user-set voltage VSET at a second time t2. Then, the output voltage VOUT will enter into a steady state and continuously maintain at the user-set voltage VSET. At a third time t3, if the output voltage VOUT discharges to the ground terminal due to the open inductor L and schottky diode D1 of the output stage 60, the output voltage VOUT will be degreased from the user-set voltage VSET, and the divided voltage Vovp between the first resistor R1 and the second resistor R2 in the second feedback FB2 will be also decreased with the output voltage VOUT.

It should be noted that the third comparator CMP3 is used to determine whether the divided voltage Vovp between the first resistor R1 and the second resistor R2 is smaller than the reference voltage V1. Therefore, at a fourth time t4, the third comparator CMP3 will determine that the divided voltage Vovp between the first resistor R1 and the second resistor R2 is smaller than the reference voltage V1 and provide an over-voltage control signal LV to the open protection control circuit SD. Then, the open protection control circuit SD will enable an open protection according to the over-voltage control signal LV to prevent the DC-DC converter 6 from being damaged due to the open inductor L and schottky diode D1 of the output stage 60. In this embodiment, the open protection control circuit SD can be integrated in the protection control circuit PC. The protection control circuit SD is additionally illustrated for convenience of explanation and understanding. In other embodiments, the open protection control circuit SD and the protection control circuit PC can be also separated.

Figure 4:
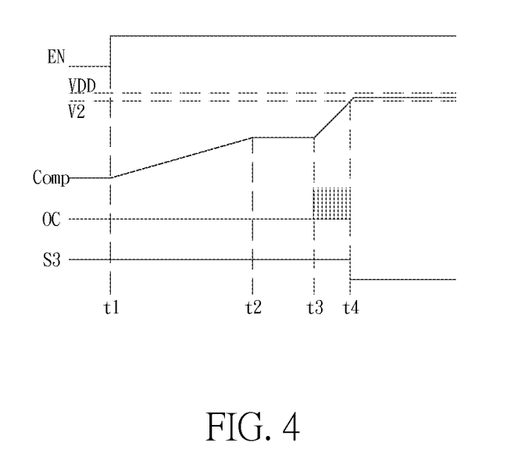
FIG. 4 illustrates a timing diagram of the signals when the DC-DC converter protection circuit of the invention provides a short protection.

Please refer to FIG. 2A and FIG. 4. FIG. 2A and FIG. 4 illustrate how the protection circuit 64 of the invention provides enough short protection to the DC-DC converter 6. When the inductor L or the schottky diode D1 of the output stage 60 is short, the output voltage VOUT will become abnormal and the input voltage VIN will directly fall between the inductor L and the schottky diode D1. Because the on-resistance (RDS, on) of the transistor MX is always very small (<1 ohm), the current flowing through the transistor MX will be far larger than the over-current setup value. At this time, the compared result of the first comparator CMP1 will be that the sensing voltage VCS related to the sensing signal is larger than the default over-voltage Voc, and an over-current control signal OC will be outputted to the protection control circuit PC according to the compared result. The protection control circuit PC determines an over-current event according to the over-current control signal OC; that is to say, the over-current control signal OC indicates the over-current event.

In addition, if the feedback voltage VFB between the light-emitting diode string LED and the feedback unit FE received by the error amplifier Gm of the first feedback circuit FB1 is larger than the reference voltage VREF, the error amplifying voltage signal (namely the first feedback voltage) Comp outputted by the error amplifier Gm will start to discharge to the ground terminal; therefore, the compared result of the second comparator CMP2 will be that the error amplifying voltage signal (namely the first feedback voltage) Comp is smaller than the reference voltage V2 (very close to the operating voltage VDD).

If the feedback voltage VFB between the light-emitting diode string LED and the feedback unit FE received by the error amplifier Gm is smaller than the reference voltage VREF, the error amplifying voltage signal Comp outputted by the error amplifier Gm will be continuously increased to increase the ratio of the duty cycle in the pulse (as the first time t1~the second time t2 shown in FIG. 4). However, because the output voltage VOUT has been failed to reach the normal voltage level, the feedback voltage VFB will have been smaller than the reference voltage VREF.

At this time, the error amplifying voltage signal Comp will increase voltage to meet the normal action of the loop until the error amplifying voltage signal Comp is larger than the reference voltage V2 (very close to the operating voltage VDD). The second comparator CMP2 will output a determining control signal SJ to the protection control circuit PC.

When the over-current control signal OC indicates the over-current event, if the error amplifying voltage signal (namely the first feedback voltage) Comp is creased and larger than the reference voltage V2, at the fourth time t4, the protection control circuit PC will determine that the inductor L and schottky diode D1 of the output stage 60 has been shorted according to the received over-current control signal OC and determining control signal SJ. At this time, the protection control circuit PC can output a low-level protection control signal S3 to the driver 62 to control the driver 62 to enable a short protection and turn off the transistor MX of the output stage 60, so that the DC-DC converter 6 will not be damaged due to the shorted the inductor L and schottky diode D1 of the output stage 60.

Figure 2B:
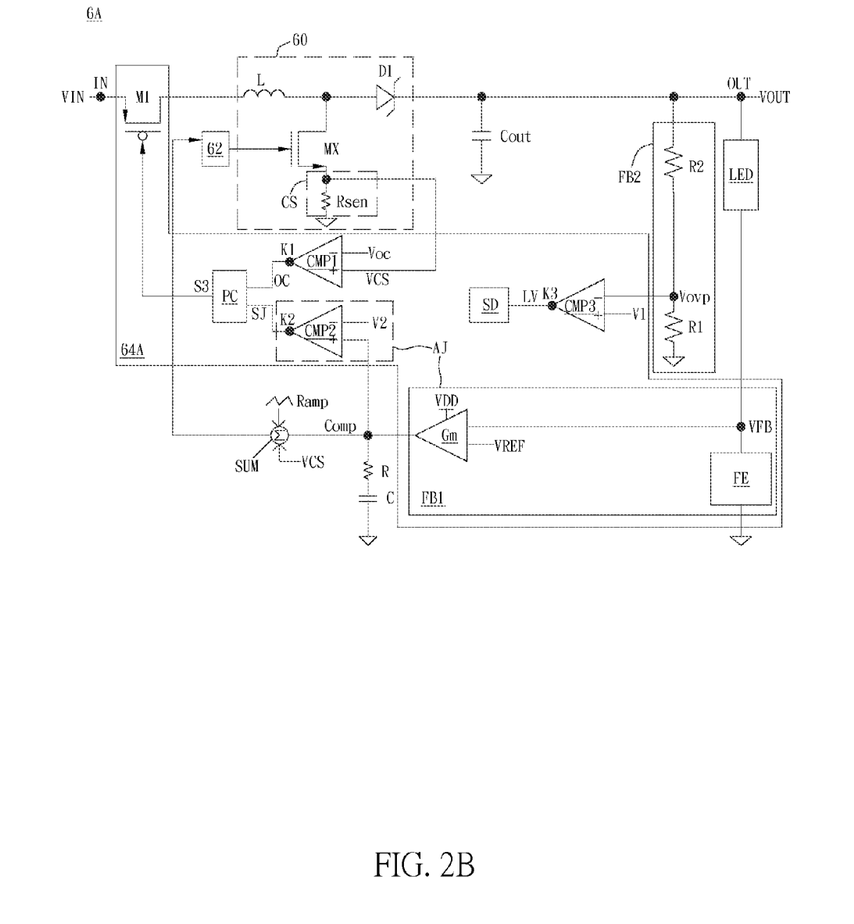
FIG. 2B illustrates a schematic diagram of the DC-DC converter protection circuit in another embodiment of the invention.
Figure 5:
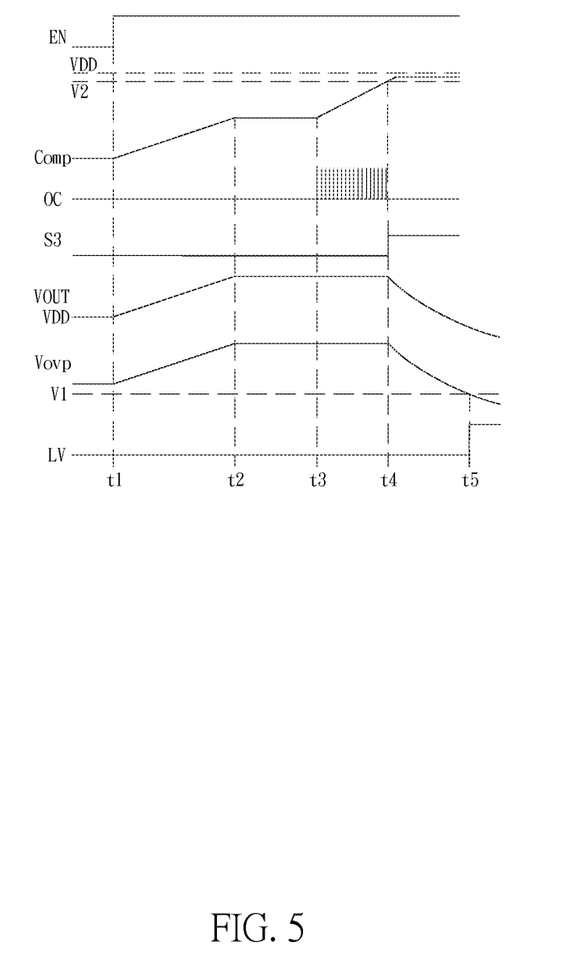
FIG. 5 illustrates a timing diagram of the signals when the DC-DC converter protection circuit of the invention provides a short protection.
Figure 6A:
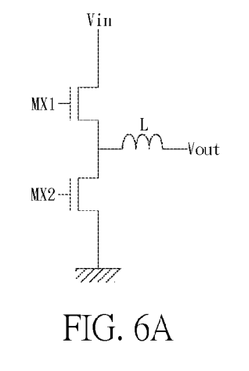
FIG. 6A~FIG. 6H illustrate possible circuit structures of the output stage of the DC-DC converter in the invention.
Figure 6B:
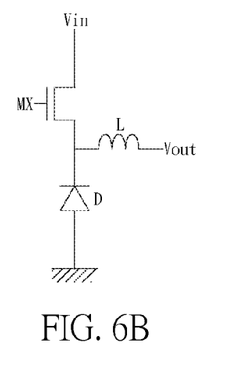
Figure 6C:
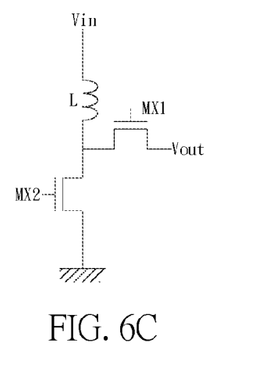
Figure 6D:
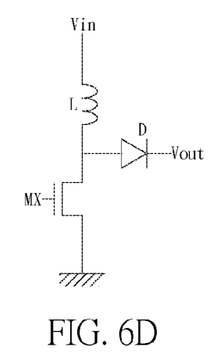
Figure 6E:
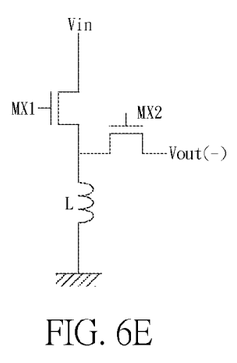
Figure 6F:
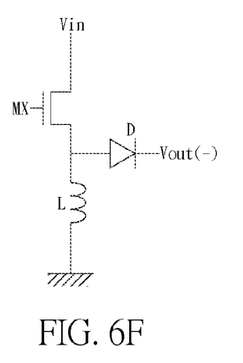
Figure 6G:
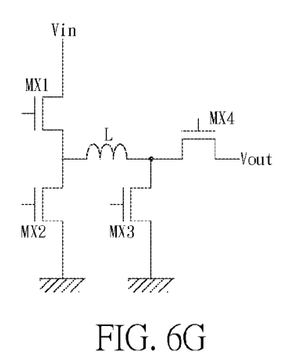
Figure 6H:
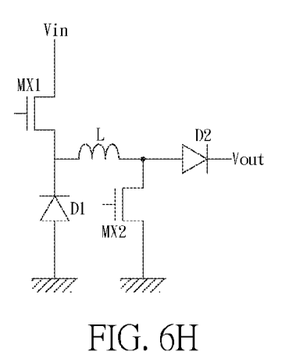

Next, please refer to FIG. 2B and FIG. 5. Unlike FIG. 2A, FIG. 2B shows that a protection transistor M1 is coupled between the input terminal IN and the output stage 60 and the protection control circuit PC is coupled to a gate of the protection transistor M1 instead of being coupled to the driver 62. As mentioned above, when the over-current control signal OC indicates the over-current event, if the error amplifying voltage signal (namely the first feedback voltage) Comp is creased and larger than the reference voltage V2, at the fourth time t4, the protection control circuit PC will determine that the inductor L and schottky diode D1 of the output stage 60 has been shorted according to the received over-current control signal OC and determining control signal SJ. At this time, the protection control circuit PC will output a low-level protection control signal S3 to turn off the protection transistor M1, so that the inductor L of the output stage 60 is open.

Then, the third comparator CMP3 is used to determine whether the divided voltage Vovp between the first resistor R1 and the second resistor R2 is smaller than the reference voltage V 1. At the fifth time t5, if the result determined by the third comparator CMP3 is yes, it means that the output voltage VOUT becomes abnormal, the third comparator CMP3 will output the over-voltage control signal LV to the protection control circuit SD, and the protection control circuit SD will enable an open protection according to the over-voltage control signal LV to prevent the DC-DC converter 6 from being damaged.

It should be noted that the circuit units of the output stage of the DC-DC converter in the invention can be different kinds of active circuit units and passive circuit units and are not limited by the inductor L, the schottky diode D1, and the transistor MX shown in FIG. 2A and FIG. 2B, or the output stage of the DC-DC converter can have the circuit structures as shown in FIG. 6A~FIG. 6H.

Figure 7A:
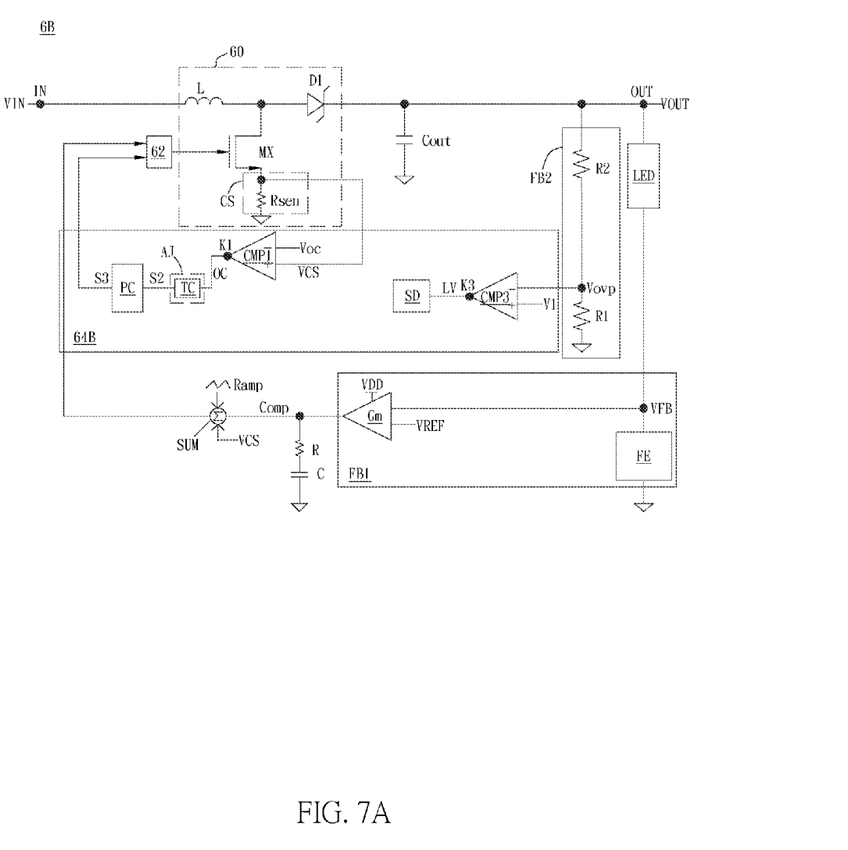
FIG. 7A illustrates a schematic diagram of the DC-DC converter protection circuit in another embodiment of the invention.
Figure 7B:
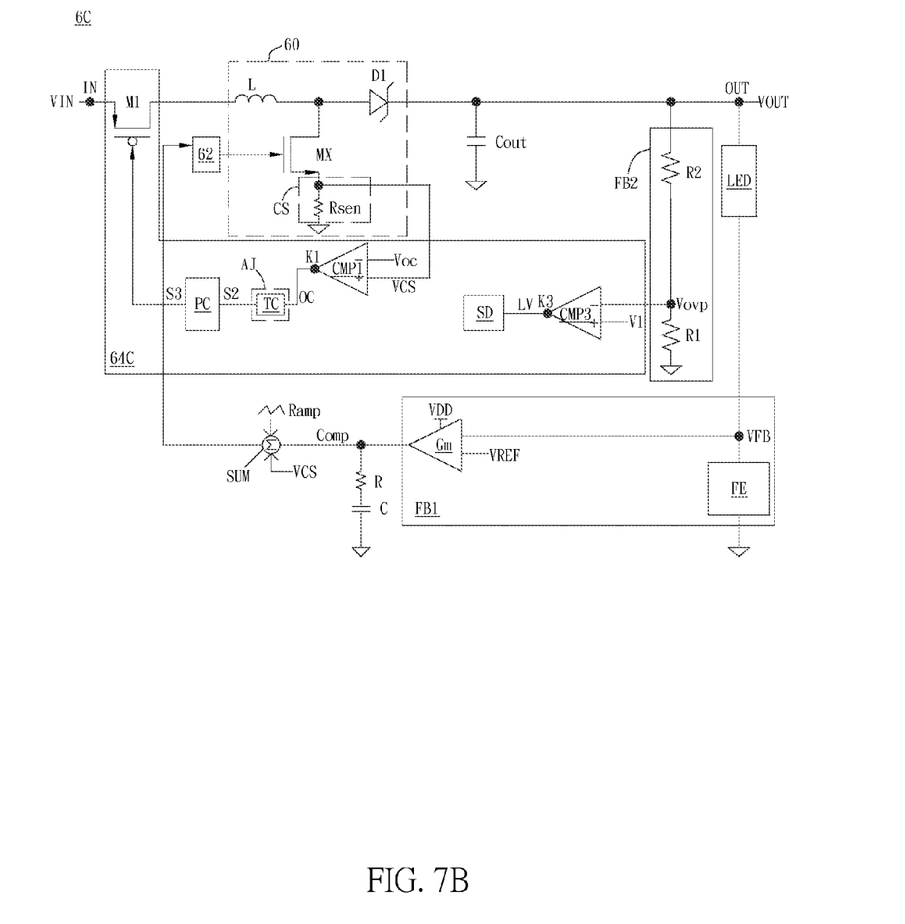
FIG. 7B illustrates a schematic diagram of the DC-DC converter protection circuit in another embodiment of the invention.

Please refer to FIG. 7A and FIG. 7B. As shown in FIG. 7A and FIG. 7B, the determining circuit AJ includes a time control circuit TC and the time control circuit TC is coupled between the first comparator CMP1 and the protection control circuit PC. Unlike FIG. 2A and FIG. 2B, FIG. 7A and FIG. 7B show the determining circuit AJ including the time control circuit TC. The difference between FIG. 7A and FIG. 7B is that the protection control circuit PC of FIG. 7A is coupled to the driver 62 while the protection control circuit PC of FIG. 7B is coupled to a gate of the protection transistor M1 between the input terminal IN and the output stage 60.

Figure 8:
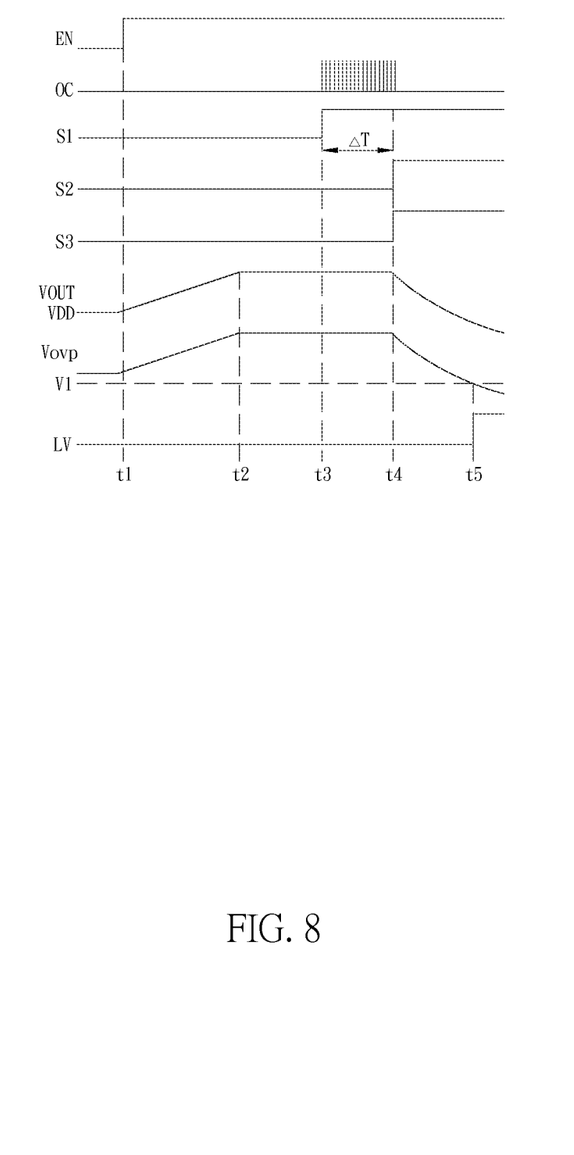
FIG. 8 illustrates a timing diagram of the signals when the DC-DC converter protection circuit of the invention provides a short protection.

In another embodiment, as shown in FIG. 7B and FIG. 8, when the first comparator CMP1 outputs the over-current control signal OC to indicate the over-current event, the time control circuit TC will start to count a default time ΔT to determine whether the output voltage VOUT is still abnormal.

When the default time ΔT is over, if the over-current control signal OC still indicates the over-current event, in order to prevent the circuit from being damaged under the over-current state for a long time, the time control circuit TC will output a high-level turn-off signal S2 to the protection control circuit PC, and the protection control circuit PC will immediately output a high-level control signal S3 to turn off the protection transistor M1 to make the inductor L open.

Then, the third comparator CMP3 is used to determine whether the divided voltage Vovp between the first resistor R1 and the second resistor R2 is smaller than the reference voltage V1. At the fifth time t5, if the result determined by the third comparator CMP3 is yes, the third comparator CMP3 will output the over-voltage control signal LV to the protection control circuit SD, and the protection control circuit SD will enable an open protection according to the over-voltage control signal LV.

Figure 9:
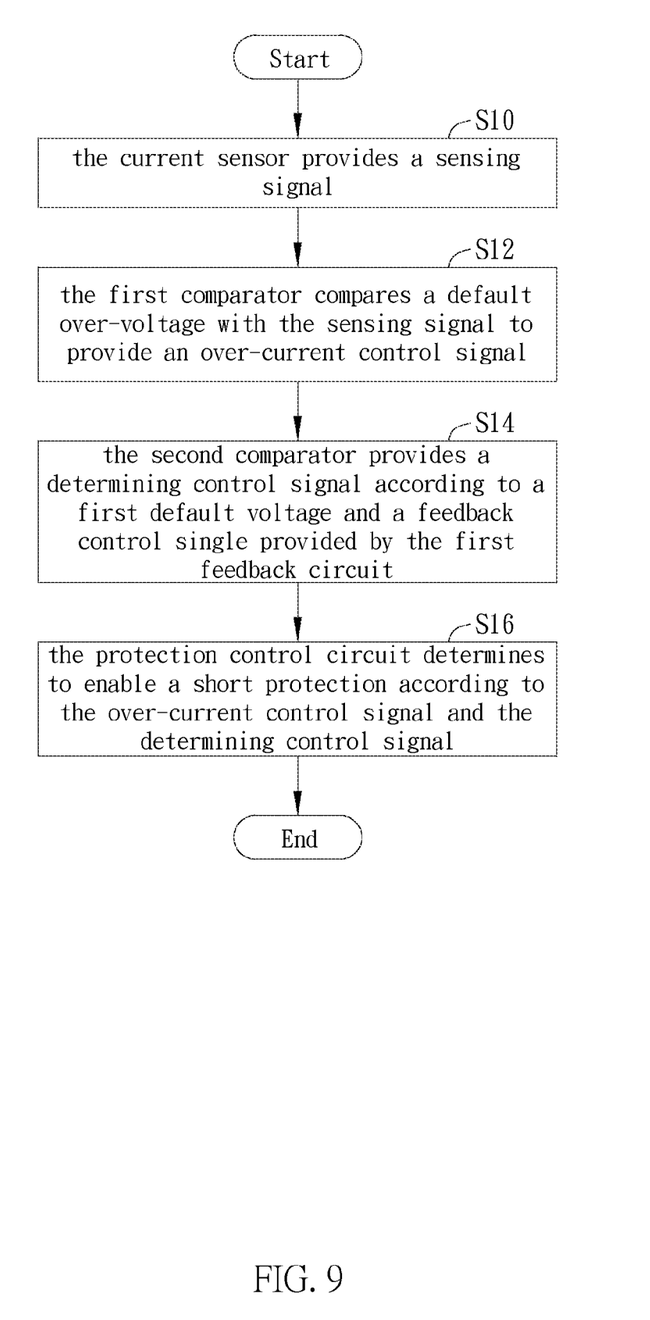
FIG. 9 illustrates a flowchart of the DC-DC converter protection method in another embodiment of the invention.

Another preferred embodiment of the invention is a protection method of a DC-DC converter. In this embodiment, the DC-DC converter includes an input terminal, an output terminal, and an output stage. The input terminal receives an input voltage and the output terminal provides an output voltage. The output stage is disposed between the input terminal and the output terminal. The protection circuit includes a current sensor, a first comparator, a determining circuit, and a protection control circuit. The determining circuit includes a second comparator and a first feedback circuit. Please refer to FIG. 9. FIG. 9 illustrates a flowchart of the DC-DC converter protection method in this embodiment.

As shown in FIG. 9, in the step S10, the current sensor provides a sensing signal. In the step S12, the first comparator compares a default over-voltage with the sensing signal to provide an over-current control signal. In the step S14, the second comparator provides a determining control signal according to a first default voltage and a feedback control single provided by the first feedback circuit. In the step S16, the protection control circuit determines to enable a short protection according to the over-current control signal and the determining control signal.

In practical applications, when the over-current control signal provided by the step S12 indicates an over-current event, the method will further determine whether the first feedback voltage is larger than a reference voltage. If the determined result is yes, the method will turn off the transistor of the output stage according to the over-current control signal and the determining control signal.

In addition, the method can also provide the feedback control signal according to the first feedback voltage and the reference voltage. When the over-current control signal provided by the step S12 indicates an over-current event, the method will further determine whether the first feedback voltage is smaller than a reference voltage and whether the feedback control signal is larger than a first default voltage. If the determined results are both yes, the method will enable a short protection according to the determining control signal provided by the step S14.

Figure 10:
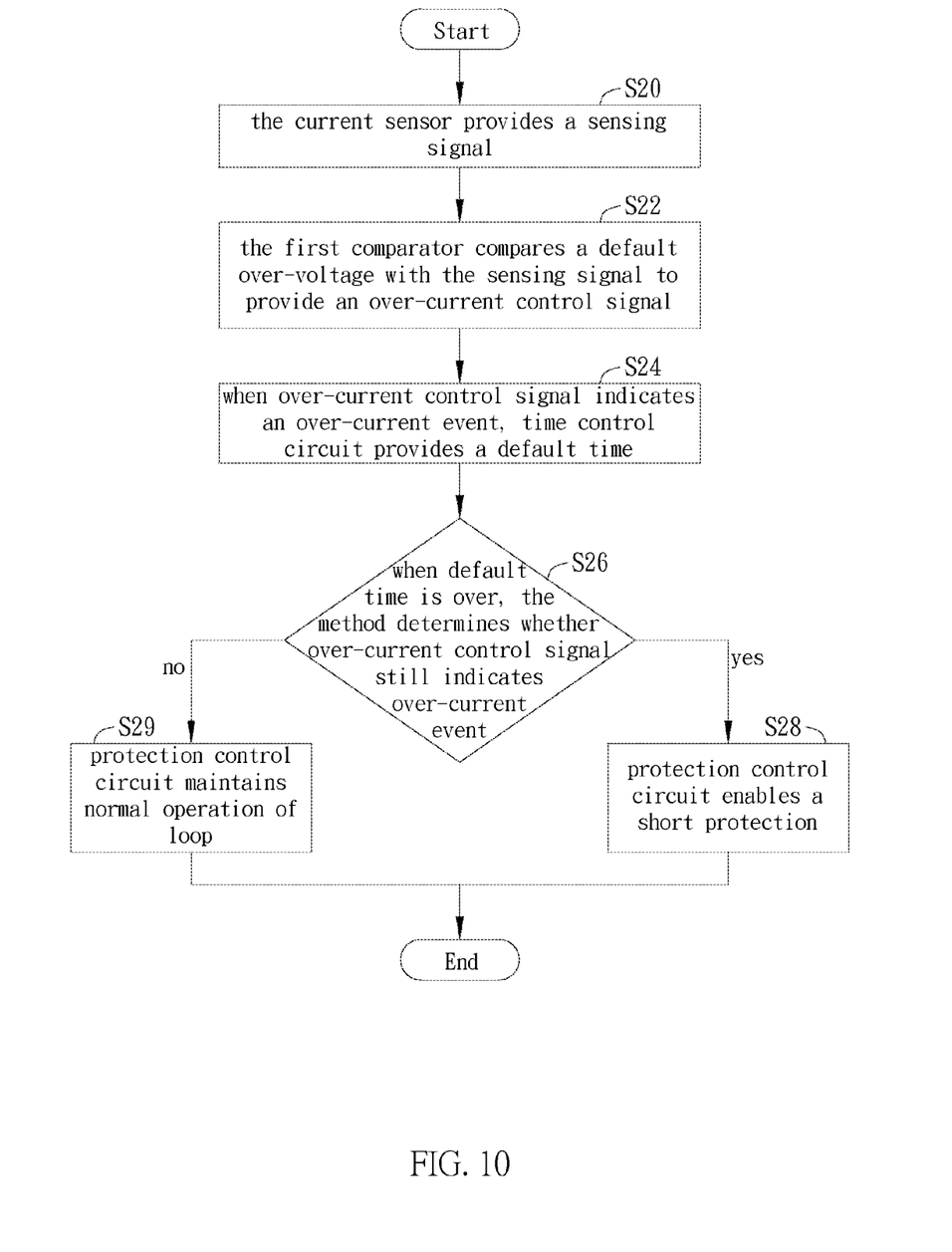
FIG. 10 illustrates a flowchart of the DC-DC converter protection method in another embodiment of the invention.

Next, please refer to FIG. 10. FIG. 10 illustrates a flowchart of the DC-DC converter protection method in another embodiment. In this embodiment, the determining circuit of the protection circuit further includes a time control circuit. As shown in FIG. 10, in the step S20, the current sensor provides a sensing signal. In the step S22, the first comparator compares a default over-voltage with the sensing signal to provide an over-current control signal. In the step S24, when the over-current control signal provided by the step S22 indicates an over-current event, the time control circuit will provide a default time. In the step S26, when the default time is over, the method will determine whether the over-current control signal still indicates the over-current event. If the result determined by the step S26 is yes, the method will perform the step S28 that the protection control circuit enables a short protection. If the result determined by the step S26 is no, the method will perform the step S29 that the protection control circuit maintains normal operation of the loop.

In practical applications, when the over-current control signal indicates the over-current event, the method can count a default time. When the default time is over, if the over-current control signal still indicates the over-current event, the method will provide the determining control signal.

Figure 11:
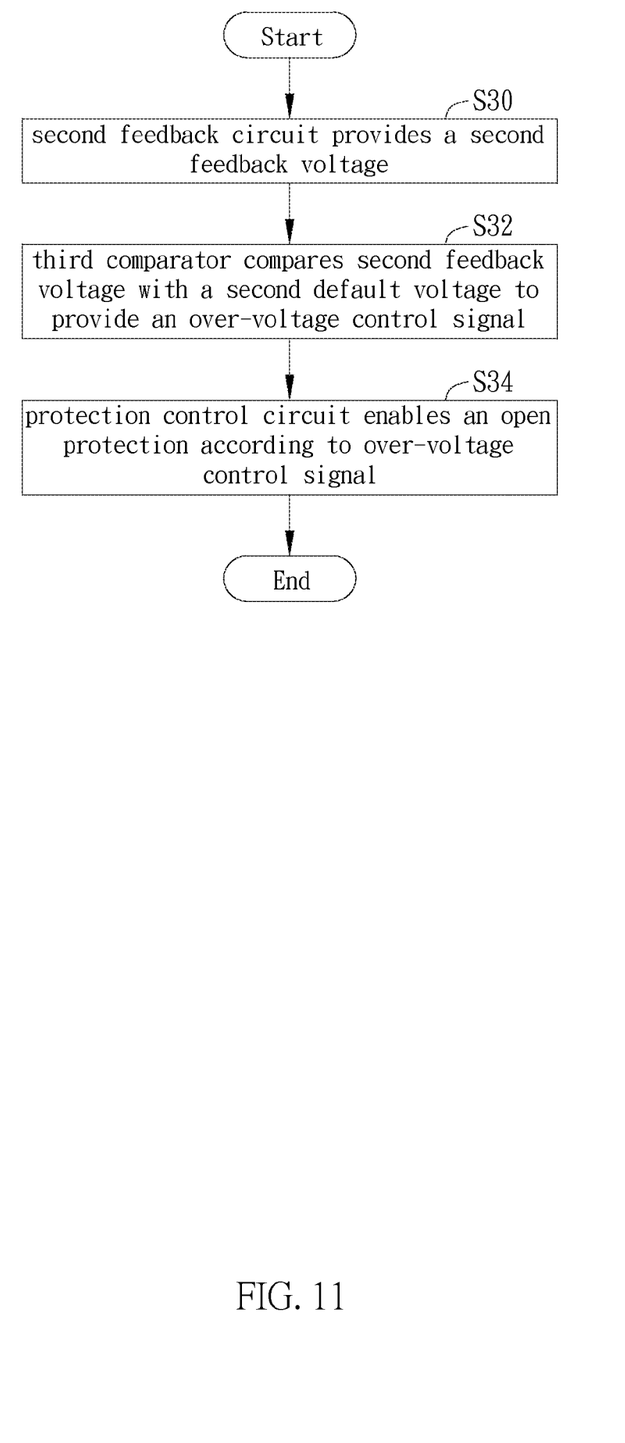
FIG. 11 illustrates a flowchart of the DC-DC converter protection method in another embodiment of the invention.

Please refer to FIG. 11. FIG. 11 illustrates a flowchart of the DC-DC converter protection method in another embodiment of the invention. In this embodiment, the protection circuit further includes a second feedback circuit and a third comparator. As shown in FIG. 11, in the step S30, the second feedback circuit provides a second feedback voltage. In the step S32, the third comparator compares the second feedback voltage with a second default voltage to provide an over-voltage control signal. In the step S34, the protection control circuit enables an open protection according to the over-voltage control signal.

Compared to the prior arts, the protection circuit and the protection method of the DC-DC converter disclosed in this invention have following advantages of:

(1) effectively determining whether the inductor and the schottky diode in the DC-DC converter is open or short to prevent the DC-DC converter circuit from being damaged;

(2) effectively preventing the DC-DC converter circuit from being in an over-current state for a long time, so that the DC-DC converter circuit will not be burned by the increasing temperature of the DC-DC converter circuit;

(3) suitable for the structures of DC-DC boost and boost LED back light driver and capable of avoiding the failure of external loop caused by the damage of DC-DC converter.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A protection circuit of a DC-DC converter, the DC-DC converter comprising an input terminal, an output terminal, and an output stage, the input terminal receiving an input voltage and the output terminal providing an output voltage, the output stage being disposed between the input terminal and the output terminal, the protection circuit comprising:
   a current sensor, coupled to at least one circuit unit of the output stage and providing a sensing signal;
   a first comparator, coupled to the current sensor and comparing a default over-voltage with the sensing signal to provide an over-current control signal;

a determining circuit, providing a determining control signal; and a protection control circuit, coupled to the determining circuit and the first comparator and determining whether to enable a short protection according to the over-current control signal and the determining control signal.

2. The protection circuit of claim 1, wherein the determining circuit comprises a first feedback circuit and a second comparator, the first feedback circuit provides a feedback control signal, the second comparator is coupled to the first feedback circuit and provides the determining control signal according to the feedback control signal and a first default voltage.

3. The protection circuit of claim 1, wherein the determining circuit comprises a first feedback circuit and a second comparator, the second comparator is coupled to the first feedback circuit, the first feedback circuit comprises an error amplifier for receiving a first feedback voltage and a reference voltage, when the over-current control signal indicates an over-current event, if the first feedback voltage is larger than the reference voltage, the protection control circuit turns off a transistor of the output stage according to the over-current control signal and the determining control signal.

4. The protection circuit of claim 1, wherein the determining circuit comprises a first feedback circuit and a second comparator, the second comparator is coupled to the first feedback circuit, the first feedback circuit comprises an error amplifier for receiving a first feedback voltage and a reference voltage and providing a feedback control signal according to the first feedback voltage and the reference voltage, when the over-current control signal indicates an over-current event, if the first feedback voltage is smaller than the reference voltage and the feedback control signal is larger than a first default voltage, the protection control circuit enables the short protection according to the determining control signal provided by the second comparator.

5. The protection circuit of claim 1, wherein the determining circuit comprises a time control circuit coupled to the first comparator, when the over-current control signal indicates an over-current event, the time control circuit counts a default time, when the default time is over, if the over-current control signal still indicates the over-current event, the time control circuit controls the protection control circuit to enable the short protection.

6. The protection circuit of claim 1, wherein when the over-current control signal indicates an over-current event, the determining circuit counts a default time, when the default time is over, if the over-current control signal still indicates the over-current event, the determining circuit provides the determining control signal.

7. The protection circuit of claim 1, further comprising a second feedback circuit and a third comparator, the second feedback circuit provides a second feedback voltage, the third comparator compares the second feedback voltage with a second default voltage to provide an over-voltage control signal, and the protection control circuit enables an open protection according to the over-voltage control signal.

8. The protection circuit of claim 1, wherein the output terminal of the DC-DC converter is coupled to at least one LED string, the determining circuit comprises a first feedback circuit, and the first feedback circuit is coupled to the at least one LED string to form a circuit for protecting a LED driving circuit.

9. The protection circuit of claim 1, wherein a protection switch is coupled between the input terminal and the output stage and coupled to the protection control circuit, when the protection control circuit enables the short protection, and the protection control circuit turns off the protection switch.

10. A protection method of a DC-DC converter, the DC-DC converter comprising an input terminal, an output terminal, and an output stage, the input terminal receiving an input voltage and the output terminal providing an output voltage, the output stage being disposed between the input terminal and the output terminal, the protection method comprising steps of:
(a) providing a sensing signal;
(b) comparing a default over-voltage with the sensing signal to provide an over-current control signal;
(c) providing a determining control signal; and
(d) determining whether to enable a short protection according to the over-current control signal and the determining control signal.

11. The protection method of claim 10, wherein the step (c) provides the determining control signal according to a feedback control signal and a first default voltage.

12. The protection method of claim 10, further comprising steps of:
when the over-current control signal indicates an over-current event, determining whether the first feedback voltage is larger than the reference voltage; and
if the first feedback voltage is larger than the reference voltage, turning off a transistor of the output stage according to the over-current control signal and the determining control signal.

13. The protection method of claim 10, further comprising steps of:
providing a feedback control signal according to the first feedback voltage and the reference voltage;
when the over-current control signal indicates an over-current event, determining whether the first feedback voltage is smaller than the reference voltage and whether the feedback control signal is larger than a first default voltage respectively; and
if the first feedback voltage is smaller than the reference voltage and the feedback control signal is larger than a first default voltage, enabling the short protection according to the determining control signal provided by the step (c).

14. The protection method of claim 10, further comprising steps of:
when the over-current control signal indicates an over-current event, counting a default time; and
when the default time is over, if the over-current control signal still indicates the over-current event, enabling the short protection.

15. The protection method of claim 10, further comprising steps of:
when the over-current control signal indicates an over-current event, counting a default time; and
when the default time is over, if the over-current control signal still indicates the over-current event, enabling the short protection according to the determining control signal provided by the step (c).

16. The protection method of claim 10, further comprising steps of:
providing a second feedback voltage;
comparing the second feedback voltage with a second default voltage to provide an over-voltage control signal; and
enabling an open protection according to the over-voltage control signal.

* * * * *